United States Patent [19]
Calzadilla

[11] 3,978,687
[45] Sept. 7, 1976

[54] MODIFIED EVAPORATOR FOR AUTOMOBILE AIR CONDITIONING SYSTEMS

[75] Inventor: Elio A. Calzadilla, Hialeah, Fla.

[73] Assignee: Faaca Inc., Hialeah, Fla.

[22] Filed: June 23, 1975

[21] Appl. No.: 589,379

[52] U.S. Cl. .................................. 62/525; 165/178
[51] Int. Cl.² ......................................... F25B 39/02
[58] Field of Search ..................... 62/515, 524, 525; 165/153, 178

[56] References Cited
UNITED STATES PATENTS

| | | | |
|---|---|---|---|
| 3,063,682 | 11/1962 | Greene et al. | 62/525 X |
| 3,275,070 | 9/1966 | Beatenbough et al. | 165/175 X |

Primary Examiner—William F. O'Dea
Assistant Examiner—Ronald C. Capossela
Attorney, Agent, or Firm—Ernest H. Schmidt

[57] ABSTRACT

An automobile air conditioning evaporator of a given height modified by the use of a pair of plate members extending opposedly outwardly of each of the core pressure and vacuum chambers at one end thereof, each pair of plate members defining therebetween a shallow flow chamber communicating between their respective core chambers and, at outer end portions thereof, respectively with substantially parallel vacuum and pressure line connector conduits, thereby increasing the spacing between said conduits with minimum increase in evaporator core width to enable use as a replacement for evaporators of comparatively greater height.

4 Claims, 3 Drawing Figures

MODIFIED EVAPORATOR FOR AUTOMOBILE AIR CONDITIONING SYSTEMS

This invention relates to automobile air conditioning systems and is directed particularly to improvements in certain sizes of evaporators for such systems rendering them universally suitable as replacement units in a multitude of automobile air conditioning systems in which they would otherwise be incapable of substitution.

Because of space limitations the evaporator and blower assembly which is ordinarily mounted under the instrument panel of the automobile in which the air conditioning system is installed, must be of compact design. To this end, very compact and efficient evaporator or heat exchange units have heretofore been devised which fit snugly in a housing structure which is generally no larger than necessary to properly contain and enclose the evaporator. For this reason, although evaporator units of one automotive air conditioning system differ only slightly in over-all size, because of their close fit within their respective housing or enclosure structures, evaporators of one manufacturer cannot ordinarily be exchanged or replaced by evaporators of another manufacturer.

It is, accordingly, the principal object of this invention to provide means for modifying a standard auto air conditioning evaporator of one manufacturer so that it will be compact enough to be used as a replacement evaporator in auto air conditioning systems of one or more other manufacturers, thereby substantially reducing stock requirements of replacement parts dealers or distributors handling such evaporator units.

It is a more particular object of this invention to provide mechanism for increasing the vertical spacing between the pressure and vacuum conduits of automobile air conditioning evaporator units of a given height of one manufacturer with such minimal increase in over-all width as to serve as replacements for evaporators of slightly greater height in evaporator-blower assemblies which would not otherwise accommodate evaporators of the lesser conduit spacing.

Yet another object of the invention is to provide a modified evaporator for automobile air conditioning systems wherein the means for outwardly offsetting the inlet and outlet conduits for increased vertical spacing therebetween comprises a pair of vertically-outwardly-extending plate members at the ends of each of the vertically-opposed, laterally-extending refrigerant flow chambers, each pair of plate members of which defines a shallow flow chamber communicating between the opposed lateral outer ends of each of the evaporator flow chambers and the mutually outwardly-offset and horizontally-outwardly-extending refrigerant inlet or outlet (respective pressure and vacuum) conduits.

Still another object of the invention is to provide a modified evaporator of the character described which will be simple in construction, inexpensive to manufacture and durable in use.

Other objects, features and advantages of the invention will be apparent from the following description when read with reference to the accompanying drawings.

In the drawings, wherein like reference numerals denote corresponding parts in each of the three views.

Figure 1:
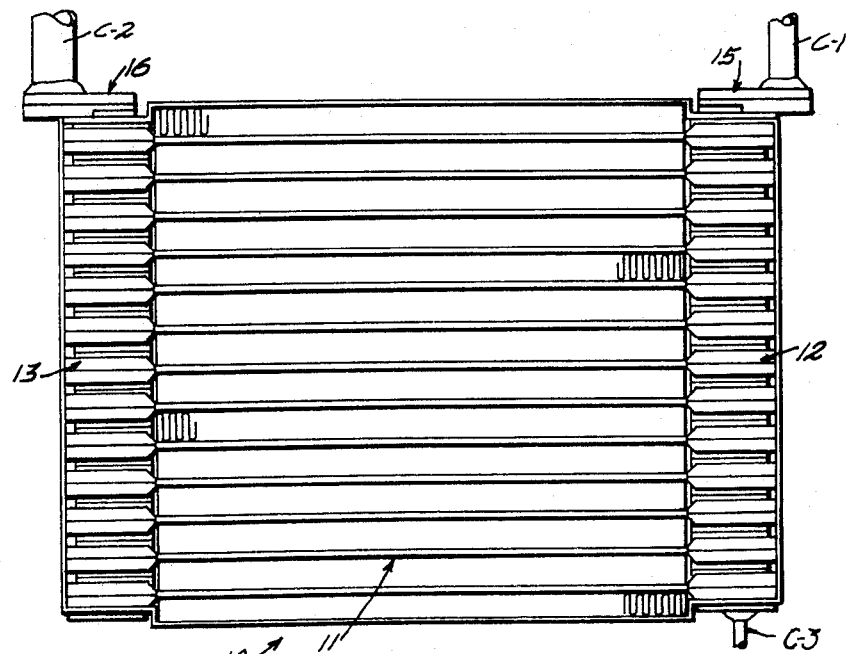
FIG. 1 is a side elevational view of a typical automobile air conditioning evaporator unit modified in accordance with this invention.
Figure 3:
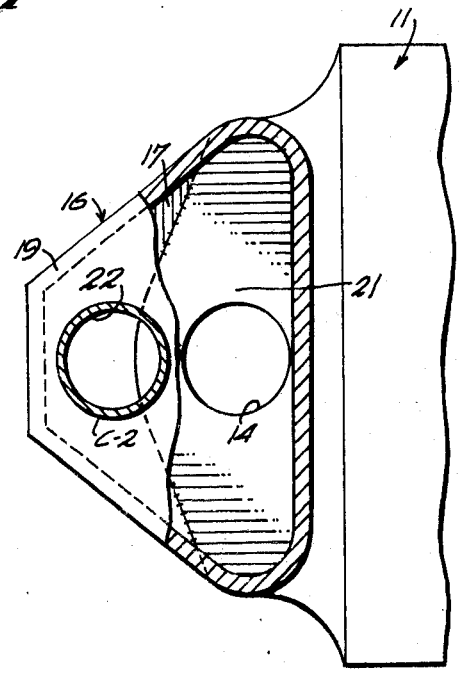
FIG. 3 is a horizontal cross-sectional view taken along the broken line 3—13 of FIG. 2 in the direction of the arrows and illustrating constructional details of the offset mechanism.

Referring now in detail to the drawings, reference numeral 10 in FIG. 1 designates a typical automobile air conditioning evaporator or heat exchanger having a central heat exchanger core 11 integrally formed and communicating at each side with opposed, parallel, through flow chambers 12 and 13 constituting the pressure and suction or vacuum sides, respectively, of the evaporator. The construction of such evaporator units of welded-together, press-formed sheet aluminum parts is well known and forms no part of this invention. Such evaporators as have heretofore been devised, however, connected with associated pressure and suction refrigerant lines through aligned openings at one side of the core plate structure of the evaporator units, such as the opening 14 of the flow chamber 13 as illustrated in FIG. 3. The vertical spacing between the pressure and suction lines has therefore heretofore been determined by the vertical spacing between the through flow chambers 12 and 13, a condition which precluded substitution of evaporators of such overall height being used as replacement for evaporators requiring pressure and suction lines of greater vertical spacing to permit interconnection with other structure of the system.

Figure 2:
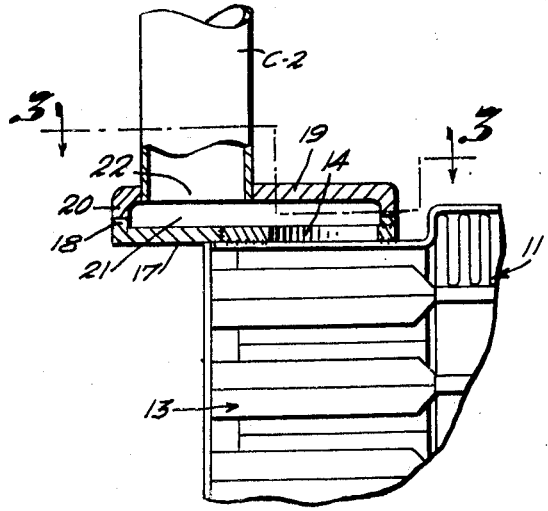
FIG. 2 is a fragmentary enlarged view, partly in cross-section, of the conduit offset mechanism at the vacuum side of the evaporator.

In accordance with this invention, extremely shallow, mutually outwardly-extending offset chambers 15, 16 are provided at the outer ends of the respective pressure and suction chambers 12 and 13. As best illustrated in FIGS. 2 and 3 each of the offset chambers 15, 16 comprises a generally triangular bottom plate 17 welded at the upper end of its respective flow chamber, said bottom plate being integrally formed with a short, peripheral, upturned flange or lip portion 18. A complementary, generally triangular upper plate member 19 having a downturned flange or lip portion 20 abutting and welded to the upper end of the lip or flange 18 of the bottom plate 17 defines therewith a shallow chamber 21 through which refrigerant may flow to communicate with its associated flow chamber (the suction flow chamber 13 as illlustrated in FIGS. 2 and 3) through an opening 14 in said bottom plate 17 in alignment with its associated flow chamber, and outwardly offset opening 22 in the upper plate member 19.

This modified construction, as is readily apparent in FIG. 1, provides for the required increased separation or spacing between the outwardly-extending parallel axes of the pressure and vacuum or liquid conduits C-2 and C-1, respectively, without any substantial increase in the width of the evaporator unit which would otherwise preclude its use as a substitute for evaporators of different manufacture having a greater over-all height (difference in lateral width as illustrated in FIG. 1). The comparatively small diameter and flexibility of the oil return line conduit C-3 in FIG. 1 permits its bending and re-routing within the space requirements of the substitute housing structure without difficulty.

While I have illustrated and described herein only one form in which my invention can conveniently be embodied in practice it is to be understood that this form is presented by way of example only and not in a limiting sense. The invention, in brief, comprises all the modifications and embodiments coming within the scope and spirit of the following claims.

What I claim as new and desire to secure by Letters Patent is:

1. In an automobile air conditioning evaporator having a rectangular heat exchange core, a refrigerant passage vacuum chamber communicating with and extending along one side of the core, a relatively parallel refrigerant passage pressure chamber communicating with and extending along the other side of the core, and a refrigerant conduit connector opening at corresponding ends of each of the core vacuum and pressure chambers; the modifications comprising, a pair of spaced, parallel plate members fixed with respect to and extending perpendicularly outwardly of one of said vacuum and pressure chambers at the connector opening end thereof, a side wall member perpendicularly interconnecting said plate members and defining therebetween a chamber for the through flow of refrigerant, one of said plate members having a through opening in communication with its associated refrigerant conduit connector opening, the other of said plate members having a refrigerant flow opening laterally offset with respect to said associated refrigerant conduit connector opening, the spacing between said plate members defining a shallow chamber having a dimension less than the diameter of the associated refrigerant conduit connector opening but of sufficient dimension to provide for the free flow of both liquid and gaseous refrigerant therethrough (a fraction of the diameter of said associated refrigerant conduit connector opening).

2. A modified automobile air conditioning evaporator as defined in claim 1 wherein each of said plate members is integrally formed with a perpendicularly extending peripheral flange portion which together form said sidewall member, said flange portions being welded together in mutually abutting disposition.

3. A modified automobile air conditioning evaporator as defined in claim 1, including a second pair of spaced, parallel, plate members fixed with respect to and extending perpendicularly outwardly of the other of said vacuum and pressure chambers at the connector opening end thereof, a side wall perpendicularly interconnecting said second pair of plate members and similarly defining therebetween a chamber for the through flow of refrigerant, one of said second pair of plate members having a through flow opening in communication with its associated refrigerant conduit connector opening, the other of said second pair of plate members having a refrigerant flow opening laterally offset with respect to its associated refrigerant conduit connector opening, the spacing between said second pair of plate members defining a shallow chamber having a dimension less than the diameter of the associated refrigerant conduit connector opening but of sufficient dimension to provide for the free flow of both liquid and gaseous refrigerant therethrough (fraction of the diameter of said associated refrigerant conduit connector opening).

4. A modified automobile air conditioning evaporator as defined in claim 3, wherein each plate member of each pair of said plate members is integrally formed with a perpendicularly extending peripheral flange portion to define the respective side wall members of each pair of said plate members, said flange portions of each pair being welded together in mutually abutting disposition.

* * * * *